United States Patent [19]
Ohkubo

[11] Patent Number: 4,719,999
[45] Date of Patent: Jan. 19, 1988

[54] PARKING DEVICE FOR AUTOMATIC TRANSMISSION

[75] Inventor: Masahiro Ohkubo, Kadoma, Japan

[73] Assignee: Kabushiki Kaisha Daikin Seisakusho, Osaka, Japan

[21] Appl. No.: 915,369

[22] Filed: Oct. 6, 1986

[30] Foreign Application Priority Data

Oct. 30, 1985 [JP] Japan ................ 60-243541

[51] Int. Cl.$^4$ .......................... B60K 41/26; B60T 1/00
[52] U.S. Cl. .................................. 192/4 A; 74/411.5; 188/31; 188/69
[58] Field of Search ............ 74/411.5; 192/4 A; 188/31, 60, 69

[56] References Cited
U.S. PATENT DOCUMENTS

| | | | |
|---|---|---|---|
| 4,576,261 | 3/1986 | Barr | 192/4 A |
| 4,614,256 | 9/1986 | Kuwayama et al. | 192/4 A |
| 4,645,046 | 2/1987 | Takano et al. | 192/4 A |

Primary Examiner—Allan D. Herrmann
Attorney, Agent, or Firm—Armstrong, Nikaido, Marmelstein & Kubovcik

[57] ABSTRACT

A parking device for an automatic transmission wherein a parking gear provided in a transmission for the automatic transmission comprising the transmission disposed at a rear stage of a torque converter is locked at the time of parking; characterized by that a leaf spring, which urges a locking arm apart from a parking gear when a driving mode is selected to a range other than P-range, is provided on a push rod moving the locking arm which locks the parking gear toward the parking gear; a pin serving as a fulcrum of the leaf spring is held to a housing of the transmission at a position where a spring force of said leaf spring functions so as to part the locking arm from the parking gear when the driving mode is selected to a range other than P-range; and the leaf spring is formed into such a shape that the leaf spring does not contact with the pin as the driving mode is shifted from R-range to P-range.

6 Claims, 4 Drawing Figures

PARKING DEVICE FOR AUTOMATIC TRANSMISSION

BACKGROUND OF THE INVENTION 1. (Industrial useful field)

This invention relates to an improvement in a parking device for an automatic transmission suitable for a commercial vehicle in which a torque converter is combined with a transmission.

2. (Prior art and its problem)

In such a conventional parking device, as shown in FIG. 4, a parking gear 102 fastened integrally to an output shaft 100 of a transmission is locked by a locking arm 104 (parking pole) so as to prevent the output shaft 100 from rotating at the time of parking.

The locking arm 104 is so constructed as to be pushed up by a cam 108 of a push rod 106 interlocked with a select lever in a driver's seat to mesh with the parking gear 102, in such a manner as accompanied by a time lag function produced by a coil spring 100, i.e. a function that the cam 108 is elastically pushed by the coil spring 110 when a projection of the locking arm 104 strikes against a top portion of the parking gear 102 and the projection of the locking arm 104 is meshed with its bottom portion after the parking gear 102 revolves.

Further, the locking arm 104 is held to a housing of the transmission through a shaft 112 and a return spring 114, which urges the locking arm 104 apart from the parking gear 102 when a driving range other than P-range (parking range) is selected, is wound around the shaft 112.

However, in a weighty commercial vehicle such as a truck, the locking arm 104 itself is constructed rigidly so that a mass of the locking arm increases and, in addition, a spring of suspension for such truck becomes hard to cause a large vibration to be transmitted to the vehicle. Therefore, the locking arm 104 jumps up against a spring force of the return spring 114 and strikes against said parking gear 102 undesirably.

Moreover, when the spring force of the return spring 114 is stiffened unnecessarily, a force for controlling the push rod 106 is increased uselessly to worsen a driver's feeling of shifting operation.

3. (Object of the Invention)

An object of the present invention is to provide a parking device for an automatic transmission, in which (1) an operating force of a manual select lever can be reduced when P-range is selected; (2) a locking arm is securely parted from a parking gear when a driving range other than P-range is selected; (3) a push rod can be positioned easily even when a distance is short between the locking arm and a transmission side lever interlocked with the select lever.

(COMPOSITION OF THE INVENTION)

(1) Technical measure

A parking device for an automatic transmission wherein a parking gear provided in a transmission for the automatic transmission comprising the transmission disposed at a rear stage of a torque converter is locked at the time of parking; characterized by that a leaf spring, which urges a locking arm apart from the parking gear when a driving mode is selected to a range other than P-range, is provided on a push rod moving the locking arm which locks the parking gear toward the parking gear; a pin serving as a fulcrum of the leaf spring is held to a housing of the transmission at a position where a spring force of said leaf spring functions so as to part the locking arm from the parking gear when the driving mode is selected to a range other than P-range; and the leaf spring is formed into such a shape that the leaf spring does not contact with the pin as the driving mode is shifted from R-range to P-range.

(2) Function

The leaf spring urges the locking arm apart from the parking gear in a range other than P-range.

Even if the spring force of the leaf spring is not increased so much, the locking arm does not strike against the parking gear and a selection operating force from R-range to P-range becomes small.

DETAILED DESCRIPTION OF THE INVENTION (Embodiment)

Figure 1:
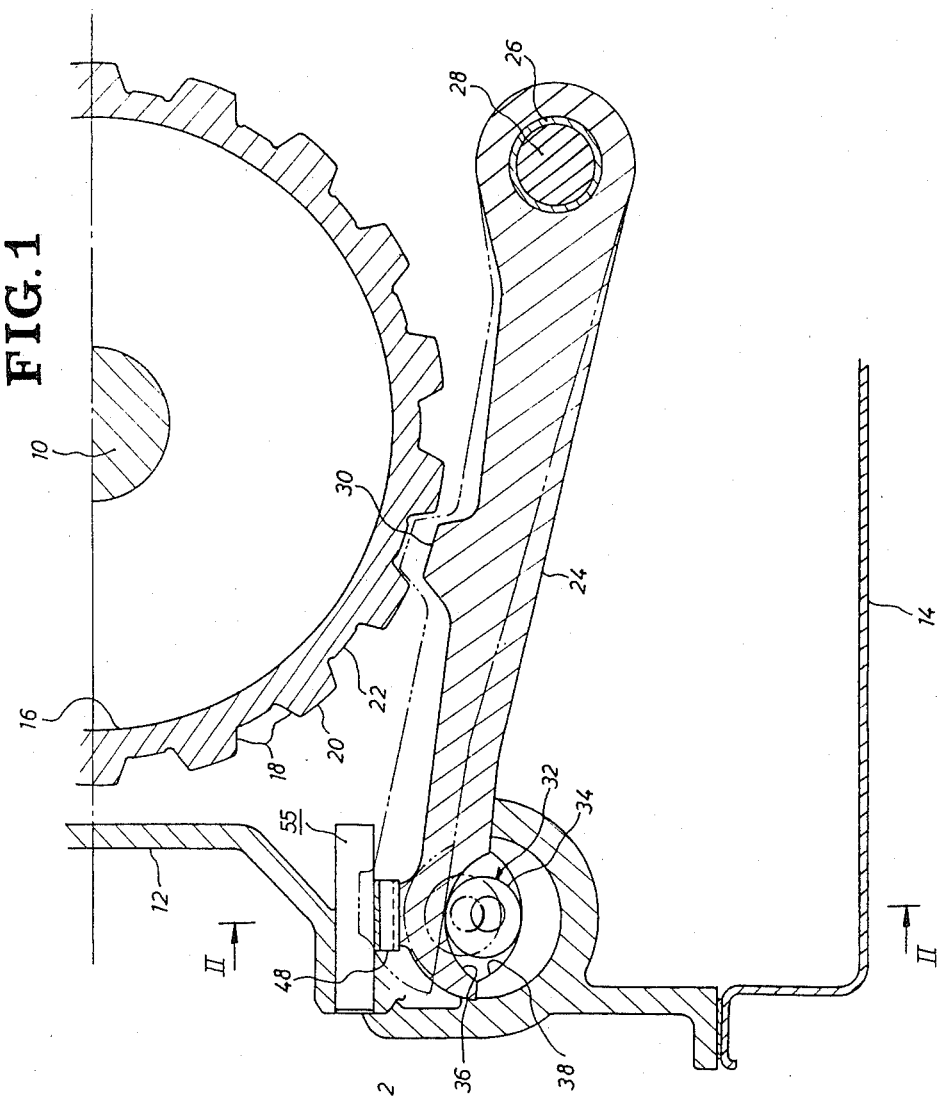
FIG. 1 is a vertical sectional view perpendicular to an axial direction of a planetary gear transmission in an automatic transmission employed in the present invention.

In FIG. 1 showing the sectional view perpendicular to the axial direction of the planetary gear transmission in the automatic transmission for use in a truck, for example, according to the present invention, 10 is an output shaft. A front end of the output shaft 10 is interconnected to a torque converter and a rear end of the output shaft 10 is interconnected to a driving shaft. Incidentally, in the figure, 12 is a housing and 14 is an oil pan.

A parking gear 16 is fastened to the output shaft 10 and the parking gear 16 always rotates integrally with the output shaft 10. A top portion 20 and a bottom portion 22 connected by an inclined face 18 are formed by turns on an outer peripheral surface of the parking gear 16. A locking arm 24 is disposed at under the parking gear 16 in a direction perpendicular to the output shaft 10, and a right end in the figure of the locking arm 24 is supported by a shaft 28 freely rockingly through a bush 26. Incidentally, a member corresponding to a conventional return spring 114 (FIG. 4) is not installed on the shaft 28.

A projection 30 is formed on an intermediate top face of the locking arm 24, and the projection 30 is preset to such a shape as to fit in the bottom portion 22. Further, an approximately half elliptical taper surface 36 slidingly contacting with a cam 34 of a push rod 32 is formed on a right end lower face of the locking arm 24. The taper surface 36 is adapted to be a counterpart of a taper surface 38 provided on the housing 12.

Figure 2:
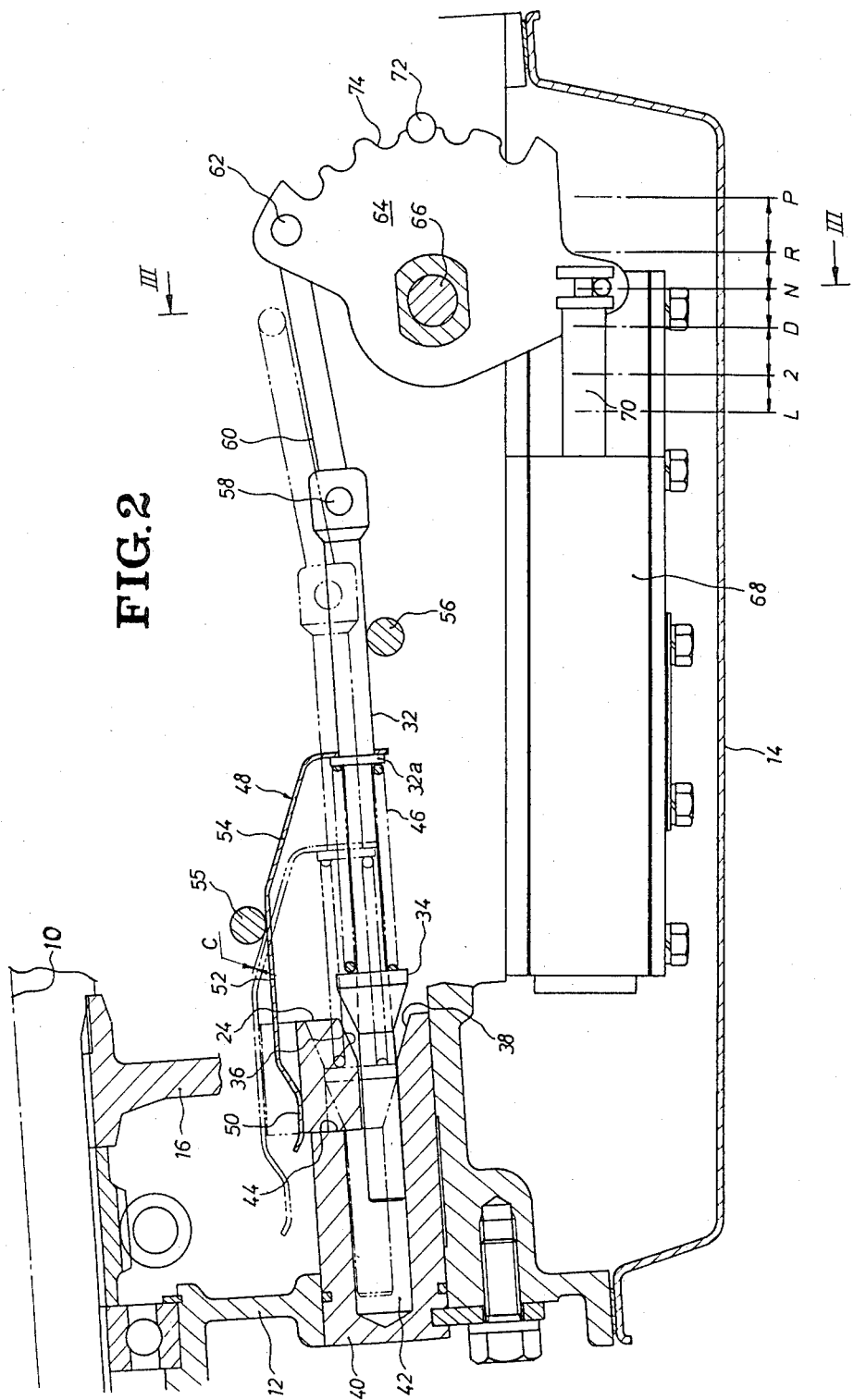
FIG. 2 is a sectional view taken on a line II—II of FIG. 1.

In FIG. 2 showing the sectional view taken on the line II—II of FIG. 1, the taper surface 38 is formed at the right end of a sleeve 40, and a hole 42 receiving the tip end of the push rod 32 is formed on the sleeve 40. The locking arm 24 slidingly contacts on an end face 44 of the sleeve 40 in such a manner as rocking freely in a vertical direction.

The cam 34 fits onto the push rod 32 freely slidingly and is urged toward left side in the figure by means of a coil spring 46 interposed between a flange 32a of the push rod 32 and the cam 34.

Further, a base end of a leaf spring 48 is fixed to the push rod 32. A presser part 50, an arched part 52 and an inclined part 54 are formed on the leaf spring 48, and the tip end pressure part 50 is so formed as to press on an upper surface of the locking arm 24 and depress it downward when the driving mode is selected to a range other than P-range as illustrated by a solid line.

The arched part 52 is so formed as to step over the upper surface of the locking arm 24 in order not to transmit the spring force to the locking arm 24 when the driving mode is selected to P-range as illustrated by a two-dot chain line in the figure. The inclined part 54 is so inclined by a specified angle as to depart from a pin, which will be described later in details, samely when the driving mode is selected to P-range.

The pin 55 extends perpendicularly to the plane of FIG. 2 to be held by the housing 12 (FIG. 1). The pin 55 presses on an upper face of the arched part 52 to function as a fulcrum which permits the leaf spring 48 to exert its spring force downward when the driving mode is selected to a range other than P-range (solid line in FIG. 2) such as R-range~L-range.

A pin 56 held to the housing 12 samely as the pin 55 is disposed under the push rod 32 and the pin 56 maintains the push rod 32 at approximately horizontal position when the drive mode is selected to a range other than P-range.

A front end of a connecting rod 60 is connected to a base end, i.e. a right end of FIG. 2, of the push rod 32 through a shaft 58, and a rear end of the connecting rod 60 is connected to a link plate 64 through a shaft 62. The link plate 64 freely pivots on and integrally with a shaft 66.

The link plate 64 is an approximately semi-circular disc-like member, and a sleeve 70 of a manual valve 68 is linked to a bottom end of the link plate 64. The manual valve 68 is interconnected to a manual select lever in a driver's seat as described later in details, and this valve has a function of changing over a hydraulic change-speed-stage control mechanism while being interconnected to the manual select lever. Accordingly, a change-speed operation of the manual valve 68 allows said hydraulic change-speed-stage control mechanism to be changed to P-range (parking), R-range (reverse), N-range (neutral), D-range, 2-range and L-range.

Incidentally, 72 is a steel ball which is urged toward a center of the link plate 64 and fitted in a groove 74 by a not-shown spring to position a changing position of each range.

Figure 3:
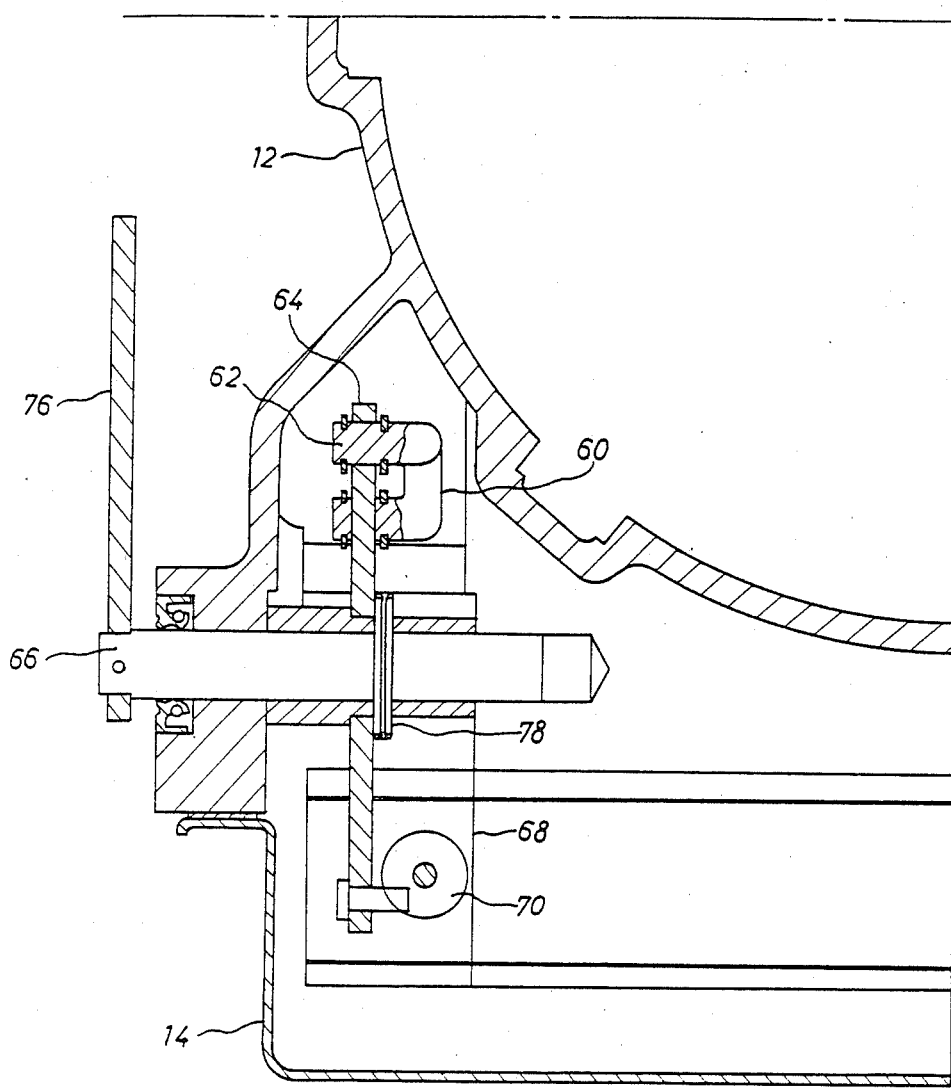
FIG. 3 is a sectional view taken on a line III—III of FIG. 2.

In FIG. 3 showing the section taken on the line III—III of FIG. 2, the shaft 66 extends toward an outside of the housing 12 and a lever 76 is fastened to the shaft 66. The lever 76 is interlocked to the not-shown manual select lever in the driver's seat through a link mechanism. Incidentally, 78 of FIG. 3 is a slit pin.

Function will be described hereunder. When the shaft 66 revolves in FIG. 2, the shaft 62 and the sleeve 70 linked to the link plate move. When the driving mode is selected to N-range as illustrated by a solid line of FIG. 2 for example, the cam 34 of the push rod 32 is departing from the taper surface 38 and the locking arm 24 is depressed downward by the presser part 50 of the leaf spring 48.

Further the pin 55 presses on the arched part 52 and the pin 55 functions as a fulcrum of the leaf spring 48 to allow the leaf spring 48 to exerts its spring force through the presser part 50 down-ward. Consequently, the locking arm 24 is held at a position apart from the parking gear 16 by means of the spring force of the leaf spring 48.

When the link plate 64 revolves counterlockwise to select P-range, the push rod 32 proceeds leftward in FIG. 2 while pushing up the taper surface 36 of the locking arm 24 through the cam 34 and finally pushes the taper surface 36 of the locking arm 24 up to its topmost position as illustrated by the two-dot chain line of the figure. In this instance, the leaf spring 48 moves together with the push rod 32 toward the left side of figure, and the presser part 50 leaves the upper face of the locking arm 24 to allow the arched part 52 to step over the locking arm 24 in such a manner that the spring force gives no effect on the locking arm 24. Further, a clearance C is produced between the pin 55 and the inclined part 54 to cause non-contacting state between the pin 55 and the leaf spring 48.

When the locking arm 24 has been pushed up to its topmost position, the projection 30 fits in the bottom portion 22 of the parking gear 16 to inhibit the rotation of the parking gear 16. Thus, the parking state is accomplished.

In the above shifting operation from R-range to P-range, the spring force of the return spring 46 functions always without interfering with the movement of the push rod 32 as has been encountered in the conventional automatic transmission, and moreover the spring force of the leaf spring 48 does not act on the locking arm 24 under a state that the presser part 50 departs from the upper surface of the locking arm 24. Therefore, the push rod 32 moves smoothly to provide a good feeling of shifting operation from R-range to P-range.

Furthermore, when the projection 30 of the locking arm 24 strikes against the top part 20 of the parking gear 16 in FIG. 1, the cam 34 of FIG. 2 slides relatively to the push rod 32 to permit only the push rod 32 to move in advance. Then, when the projection 30 becomes able to fit in the bottom portion 22 after the parking gear 16 has revolved a little, the spring force of the coil spring 46 presses on the cam 34 to a position shown by the two-dot chain line of FIG. 2 and pushes up the locking arm 24 to its locking position.

(Effect of the invention)

As described above, in the parking device for automatic transmission according to the present invention, the push rod 32 proceeds leftward in FIG. 2 while pushing up the taper surface 36 of the locking arm 24 through the cam 34 so that the parking gear 16 can be locked by the projection 30 of the locking arm 24 as shown by the two-dot chain line of the figure.

Accordingly, when the driving mode is shifted from P-range to R-range, the spring force of the return spring 46 functions always without interfering with the movement of the push rod 32 as has been encountered in the conventional automatic transmission, and moreover the spring force of the leaf spring 48 does not act on the locking arm 24 under the state that the presser part 50 departs from the upper surface of the locking arm 24. Therefore, the push rod 32 moves smoothly so that the feeling of shifting operation from R-range to P-range can be improved.

Figure 4:
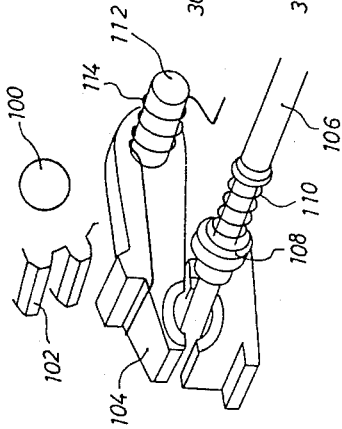
FIG. 4 is an oblique view showing a conventional embodiment.

Further, when the driving mode is selected to a range other than P-range such as R-range~L-range, the presser part 50 of the leaf spring 48 is able to urge the locking arm 24 downward apart from the parking gear 16 so that the locking arm 24 can be positioned without using the conventional return spring 114 (FIG. 4).

Especially, when a distance between the select lever position and the locking arm 24 is short, the linkage mechanism such as the push rod 32, the coil spring 46 and the leaf spring 48 etc. can be constructed cheaply.

(Another embodiment)

The present invention is applicable not only to the above-mentioned automatic transmission wherein the torque converter is combined with the planetary gear transmission, but also to an automatic transmission wherein a double-shaft type transmission is coupled to a rear stage of torque converter, for example.

What is claimed is:

1. A parking device for an automatic transmission comprising:
   (a) an automatic transmission having a housing and disposed at a rear stage of a torque converter, and having a parking gear to lock the transmission at the time of parking;
   (b) a locking arm;
   (c) a push rod to move the locking arm;
   (d) a leaf spring mounted on the push rod so as to urge the locking arm apart from said parking gear when a driving range is selected other than a parking range, and moving the locking arm to lock the parking gear when the parking range is selected; and
   (e) a pin mounted on said housing at a position where a spring force of said leaf spring functions so as to disengage said locking arm from said parking gear when the driving mode is selected to a range other than parking range, and the leaf spring is formed in such a shape that the leaf spring does not contact the pin as the driving mode is shifted to the parking range.

2. A parking device for an automatic transmission as set forth in claim 1, wherein said pin is disposed in a position to contact said leaf spring and to transmit the spring force to the locking arm to disengage a projection of said locking arm from a recess of said parking gear when the driving mode is selected to move from said parking range to another driving range.

3. A parking device for an automatic transmission as set forth in claim 1, wherein a sleeve is mounted on said housing and disposed so as to receive a tip end of said push rod for sliding movement and having a taper surface, a cam provided on said push rod, and a taper surface on said locking arm whereby when the driving mode is selected for parking range said cam engages the taper surface on said sleeve and on said push rod to move said locking arm to interconnect with said parking gear.

4. A parking device for an automatic transmission as set forth in claim 1; in which a presser part, an arched part and an inclined part are consecutively formed on the leaf spring, said presser part being so formed as to press on an upper surface of the locking arm to transmit the spring force to the locking arm when the driving mode is selected to a range other than P-range, said arched part being formed into an approximately arched shape stepping over the upper surface of the locking arm in order not to transmit the spring force to the locking arm when the driving mode is selected to P-range, and said inclined part being so inclined as to depart from the pin when the driving mode is selected to P-range.

5. A parking device for an automatic transmission as set forth in claim 1, in which an auxiliary pin is provided at a specified position opposite to said pin across the push rod, said auxiliary pin maintaining the push rod at an approximately horizontal position when the driving mode is selected to a range other than P-range.

6. A parking device for an automatic transmission wherein a parking gear provided in a transmission for the automatic transmission comprising the transmission disposed at a rear stage of a torque converter is locked at the time of parking; characterized by that a leaf spring, which urges a locking arm apart from said parking gear when a driving mode is selected to a range other than P-range, is provided on a push rod moving the locking arm which locks the parking gear toward the parking gear; a pin serving as a fulcrum of the leaf spring is held to a housing of the transmission at a position where a spring force of said leaf spring functions so as to part the locking arm from the parking gear when the driving mode is selected to a range other than P-range, the leaf spring being formed into such a shape that the leaf spring does not contact with the pin as the driving mode is shifted from R-range to P-range; a presser part, an arched part and an inclined part are consecutively formed on the leaf spring, said presser part being so formed as to press on an upper surface of the locking arm to transmit the spring force to the locking arm when the driving mode is selected to a range other than P-range, said arched part being formed into an approximately arched shape stepping over the upper surface of the locking arm in order not to transmit the spring force to the locking arm when the driving mode is selected to P-range, and said inclined part being so inclined as to depart from the pin when the driving mode is selected to P-range; the pin is held to the housing and disposed at such a position as to contact with a part of the leaf spring to transmit the spring force to the locking arm when the driving mode is selected to a range other than P-range; an auxiliary pin is provided at a position opposite to said pin across the push rod and slidingly contacting with the push rod, said auxiliary pin maintaining the push rod at an approximately horizontal position when the driving mode is selected to a range other than P-range; a sleeve in which a tip end of the push rod fits freely slidingly is installed in the housing; a taper surface with which a cam provided on the push rod slidingly contacts is formed on the sleeve; a taper surface with which said cam slidingly contacts is formed also on said locking arm in such a manner that this taper surface faces on the taper surface of the sleeve; and said push rod is interconnected to a change-speed-stage selection manual lever through a link plate.

* * * * *